April 8, 1941.  R. W. POINTER  2,238,001
TRAILER CONSTRUCTION
Filed Aug. 15, 1938   3 Sheets-Sheet 1
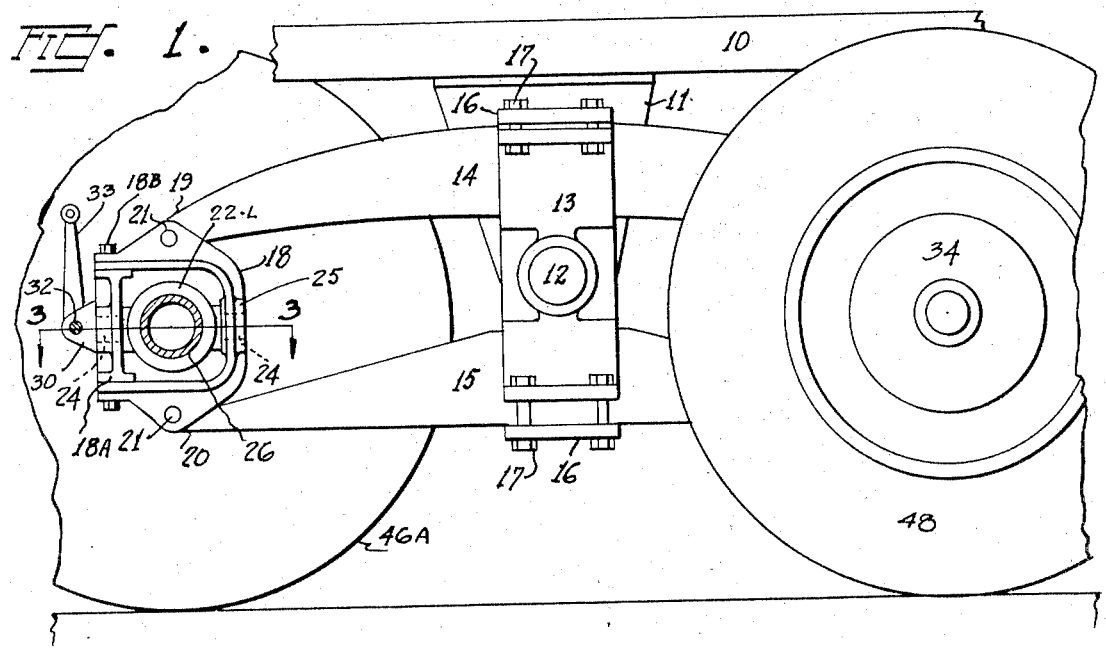
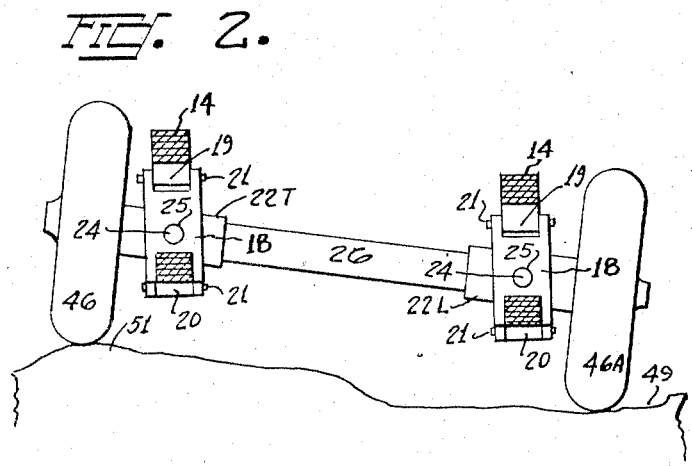
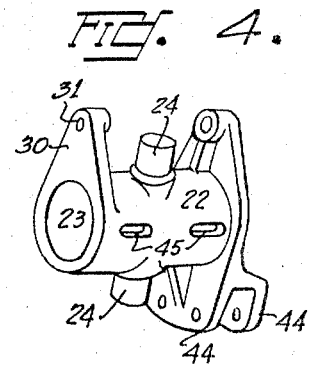
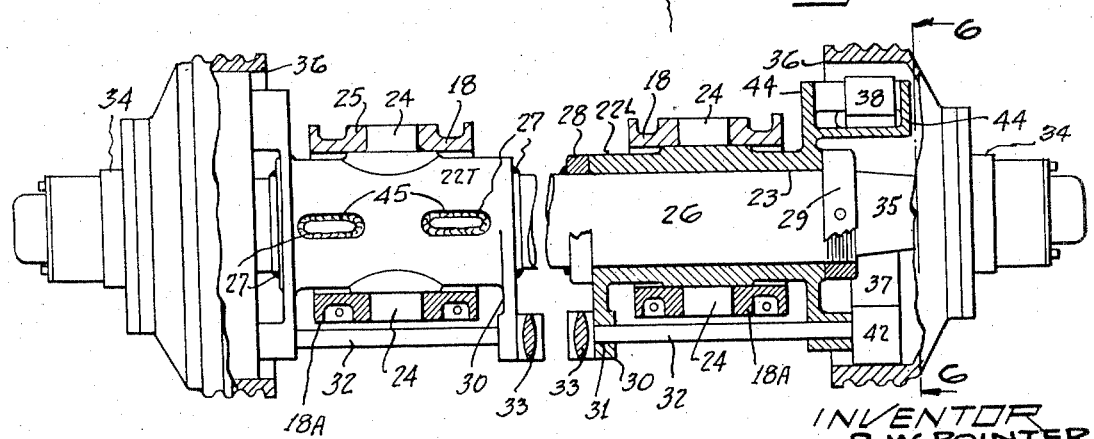
INVENTOR
R. W. POINTER
BY
ATTORNEY

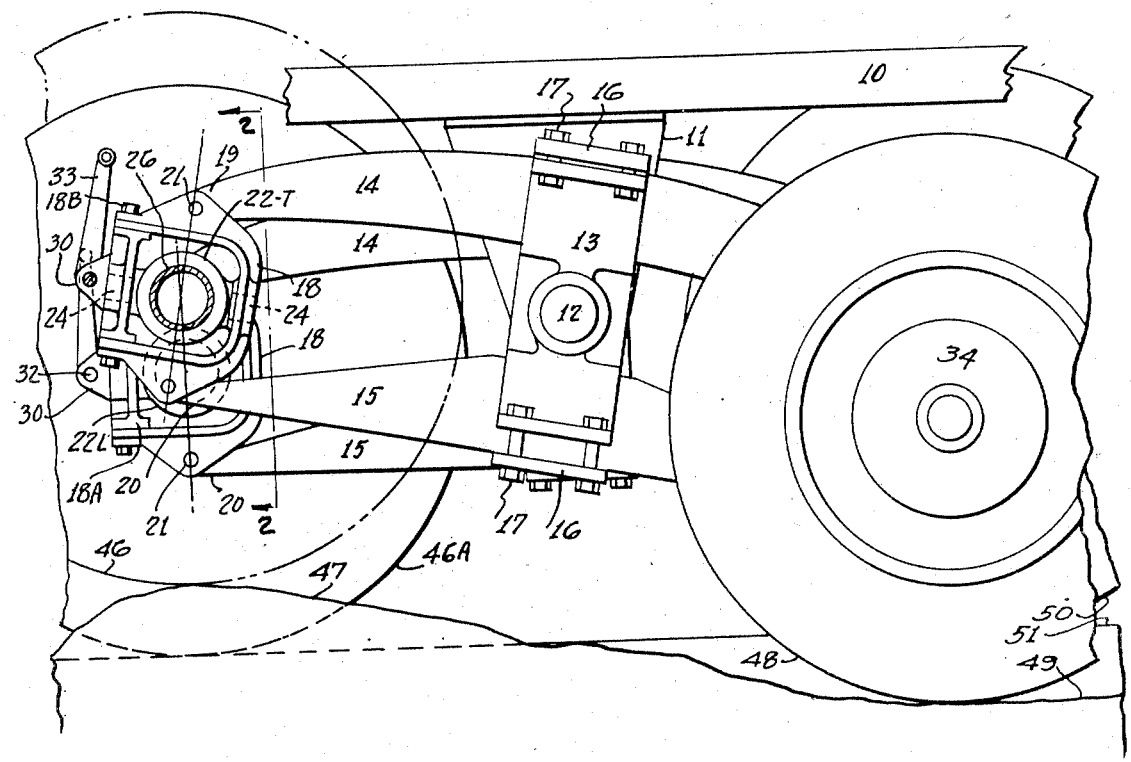
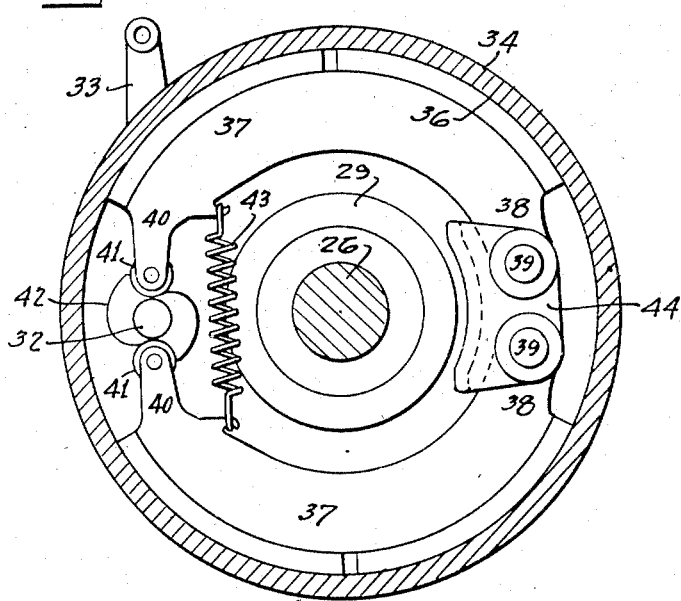

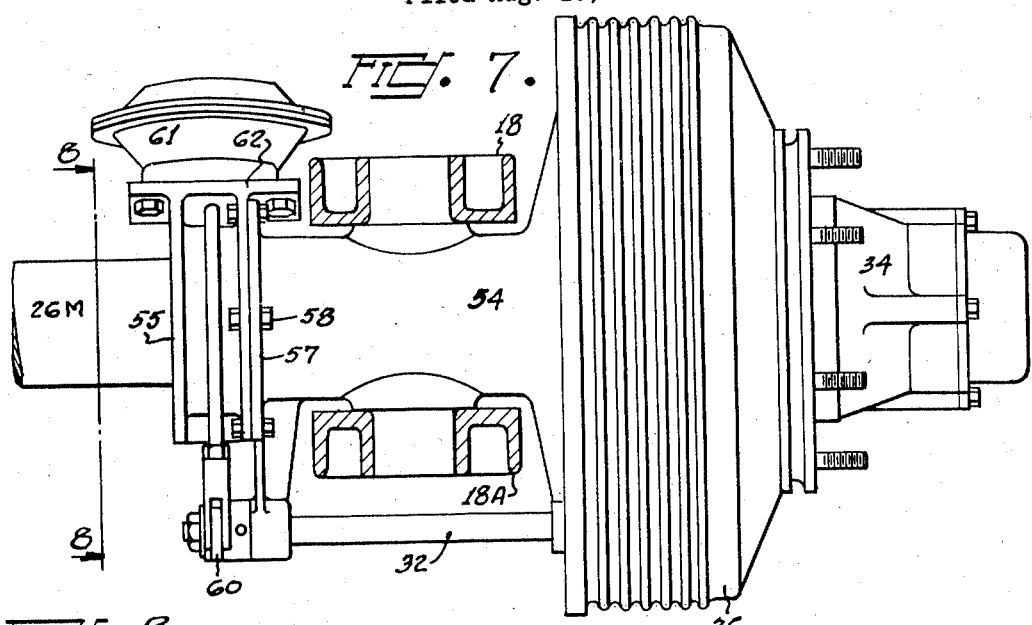
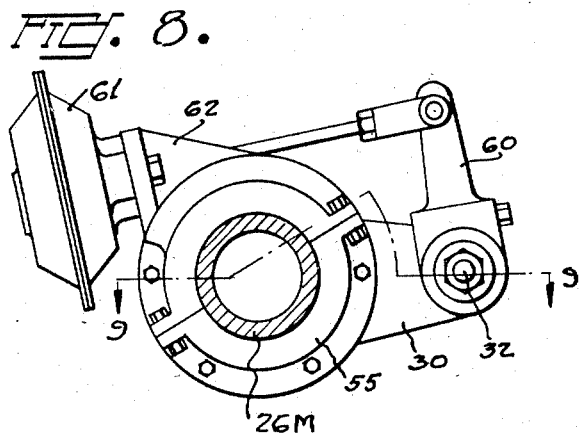
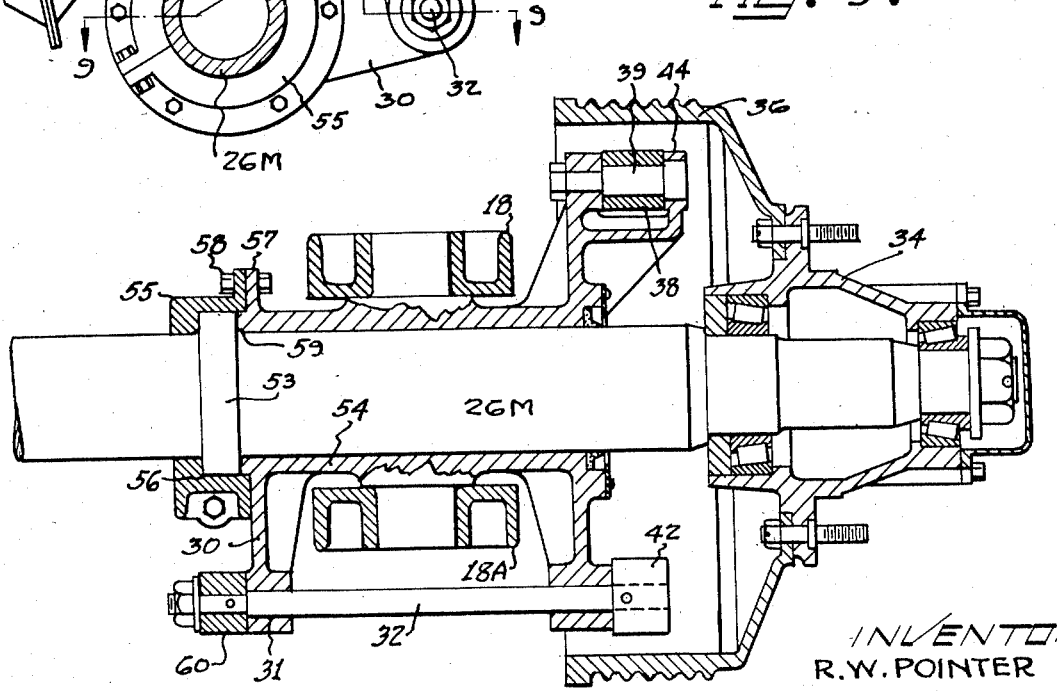
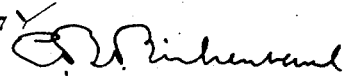

Patented Apr. 8, 1941

2,238,001

UNITED STATES PATENT OFFICE 2,238,001

TRAILER CONSTRUCTION

Robert W. Pointer, Portland, Oreg., assignor of one-half to Willamette Iron & Steel Corporation, Portland, Oreg., a corporation of Oregon Application August 15, 1938, Serial No. 224,912

2 Claims. (Cl. 280—124)

This invention relates generally to land travelling vehicles, and particularly to a trailer construction.

The main object of this invention is to provide a trailer construction that will eliminate all torsional stresses in the axle beams due to the inequalities of the road surface and at the same time relieve the axle of all brake torque.

The second object is to provide a trailer construction in which one brake spider is free to rotate on the axle and the other brake spider is secured to the axle while both spiders transmit the brake torque directly to the adjacent spring thus relieving the axle beam not only of the brake torque but also of the torsion due to road inequalities.

The third object is to provide an improved form of trailer construction in which an axle can be easily removed without dismantling the trailer.

I accomplish these and other objects in the manner set forth in the following specification as illustrated in the accompanying drawings, in which:

Fig. 1 is a fragmentary side elevation of my trailer construction with a portion of one axle cut off and a wheel removed to show the parts behind same.

Fig. 2 is a diagrammatic end elevation showing a position assumed by an axle when passing over an uneven roadway.

Fig. 3 is a section taken along the line 3—3 in Fig. 1.

Fig. 4 is a perspective view of the brake spider casting.

Fig. 5 is a fragmentary side elevation similar to that shown in Fig. 1 except showing a wheel on one side passing over an obstruction and a wheel on the same side dropping into a depression.

Fig. 6 is a section taken along the line 6—6 in Fig. 3.

Fig. 7 is a fragmentary plan showing an alternative form of the device with the trunnion housing shown in section.

Fig. 8 is a section taken along the line 8—8 in Fig. 7.

Fig. 9 is a section taken along the line 9—9 in Fig. 8.

Similar numerals refer to similar parts throughout the several views.

Referring in detail to the drawings, there is shown a truck frame 10, on the underside of which is secured a pair of standards 11 across which is secured a center tube 12 on the ends of which are disposed the spring chairs 13, to the upper and lower sides of which are secured the upper spring 14 and the lower spring 15 by means of the clamps 16 and bolts 17. The chairs 13 are free to rock independently on the tube 12. The tube 12 itself is secured to the standard 11. The construction thus far explained is in common use.

Between the outer ends of the springs 14 and 15 are mounted the housings 18 which are connected to the spring eyes 19 and 20 by means of the bolts 21. Mounted in the housings 18 are the brake spider castings 22—T and 22—L which are provided with a cylindrical opening 23 and transversely extending trunnions 24 which journal in the bearings 25 of the housings 18. Each housing 18 is provided with a removable gate 18—A by means of the bolts 18—B. Each gate 18—A forms a bearing for a trunnion 24. It can be seen by this construction that it is easily possible to remove the shaft 26 laterally without dismantling the entire unit.

Extending through the opening 23 are the wheel axles 26. One spider 22—T is secured by means of welds 27 to the axle 26 while the other spider 22—L is free to rotate on the axle 26 between the collars 28 and 29. On each brake spider casting 22—T and 22—L are formed the arms 30 through whose openings 31 extend the brake lever shaft 32 on one end of which is secured the brake lever 33 which is operated in any convenient manner. The wheel hub 34 is mounted on the end 35 of the axle 26 and the brake drum 36, which is secured to the hub 34, encloses the brake shoes 37 of which a common form is illustrated therein one pair of shoe ends 38 pivots on the pins 39, while the ends 40 are provided with rollers 41 for engaging the cam 42 on the brake lever shaft 32. A spring 43 urges the shoes 37 out of the engagement of the drum 36. The ears 44 which form a part of the brake spider castings 22—T and 22—L support the pins 39. It will be noted that the casting 22—T is provided with slots 45 in order that it can be securely fastened to the axle 26 by a welding process.

In the operation of this trailer, if, for example, as shown in Fig. 5, one wheel 46 passes over an obstruction 47 while the wheel 48 drops into a depression 49, that is if the wheels 46 and 48 are on different elevations, and if the wheels 46 and 48 are on the same side of the trailer then the spring chair 13 rocks on the tube 12 avoiding any twisting strains that would otherwise be placed on the mechanism. As stated, this is common practice.

But, if wheel 46 passes over an obstruction while the opposite wheel 46—A on the same axle is on level ground as shown in Fig. 5, or on a different elevation, the brake spider 22—L will rotate on the axle 26, so that the axle is relieved from possible torsional stresses. This is the outstanding feature of the invention. The other brake spider 22—T being secured to the axle 26, prevents any relative rotation of the axle. This is important as the axle is cambered and the proper location of the camber must be preserved.

Further, when wheels 46 and 46—A are in the positions described in the preceding paragraph, then, as shown in Fig. 2, the axle 26 would tilt and the respective trunnions 24 would turn in their bearings 25, thereby permitting the mechanism to freely adapt itself to the irregularities of the roadway, without undue stresses in its various component parts.

It will be noted that the brake mechanism is supported by the brake spider castings 22—T and 22—L, the former of which is secured to the axle 26 and the latter of which is free to rock thereon. Therefore, the application of the brakes will react upon the springs adjacent to the brakes instead of acting jointly upon one or the other of the two sets of springs. This is one of the features to which this invention is directed.

Referring now to the modified form of the construction shown in Figs. 7, 8 and 9, the axle 26—M is provided with a flange 53 against which the modified form of brake casting 54 is held by a split collar 55 which is provided with a recess 56 which receives the flange 53 and is secured to the flange 57 by means of the bolts 58.

In this form of the device it is desirable to make the recess 56 somewhat longer than the flanges 53 are wide and to take up the clearance by means of a washer 59 which may be placed on either side of the flange 53 for alignment purposes.

In Figs. 7 and 8 is shown the manner of attaching the brake lever 60 to the actuator 61 which is secured to the bracket 62 on the collar 55. The remaining details shown in Figs. 7 to 9 are substantially the same as in the first illustrated forms of the invention and the description thereof will not be repeated.

It must be understood that the various details of construction may be modified without departing from the spirit of this invention, and the details herein presented are merely for the purpose of illustration, it being intended to cover all such forms and modifications as fall fairly within the appended claims.

I claim:

1. In a vehicle, a pair of axles having ground engaging wheels on the outer ends thereof, a brake casting rigidly mounted on each said axle adjacent one wheel thereof, a brake casting rotatably mounted on each said axle adjacent one wheel thereof, brake drums mounted on each said wheel and cooperating with each said brake casting for transmitting braking action to said wheels, and load supporting elements non-rotatably secured longitudinally of the vehicle to said brake castings at each side of said vehicle.

2. A vehicle axle having ground engaging wheels at the outer ends thereof, brake drums mounted on each said wheel, a brake casting mounted on said axle adjacent each said wheel and having brake actuating elements carried thereon cooperating with the brake drum on said wheel, one said brake casting being freely rotatable relative to said axle, the other said brake casting being rigidly secured to said axle, and a load supporting element mounted at each side of said vehicle and non-rotatively secured longitudinally of the vehicle to said brake casting whereby the brake torque is transmitted to said load supporting elements equally from each said brake casting.

ROBERT W. POINTER.